United States Patent
Bangalore et al.

(10) Patent No.: US 8,539,065 B2
(45) Date of Patent: Sep. 17, 2013

(54) METHOD AND APPARATUS FOR PROVIDING ACCESS TO REAL TIME CONTROL PROTOCOL INFORMATION FOR IMPROVED MEDIA QUALITY CONTROL

(75) Inventors: Manjunath Sreedhara Bangalore, Sunnyvale, CA (US); Parameswaran Kumarasamy, San Jose, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1413 days.

(21) Appl. No.: 11/626,157

(22) Filed: Jan. 23, 2007

(65) Prior Publication Data

US 2008/0025320 A1 Jan. 31, 2008

Related U.S. Application Data

(63) Continuation-in-part of application No. 11/460,219, filed on Jul. 26, 2006.

(51) Int. Cl.
*G06F 15/173* (2006.01)
*H04L 12/28* (2006.01)

(52) U.S. Cl.
USPC .......... 709/224; 709/228; 709/231; 370/350; 370/352; 370/395.3

(58) Field of Classification Search
None
See application file for complete search history.

(56) References Cited

U.S. PATENT DOCUMENTS

| | | | | |
|---|---|---|---|---|
| 6,006,253 A * | 12/1999 | Kumar et al. | | 709/204 |
| 6,244,758 B1 | 6/2001 | Solymar et al. | | |
| 6,801,604 B2 * | 10/2004 | Maes et al. | | 379/88.17 |
| 6,985,956 B2 * | 1/2006 | Luke et al. | | 709/229 |
| 8,079,072 B2 * | 12/2011 | Boyle et al. | | 726/11 |
| 2002/0085561 A1 * | 7/2002 | Choi et al. | | 370/392 |
| 2004/0073641 A1 * | 4/2004 | Minhazuddin et al. | | 709/223 |
| 2004/0172464 A1 * | 9/2004 | Nag | | 709/223 |
| 2005/0076108 A1 * | 4/2005 | Li et al. | | 709/223 |
| 2005/0111467 A1 * | 5/2005 | Ng et al. | | 370/401 |
| 2005/0207443 A1 * | 9/2005 | Kawamura et al. | | 370/469 |
| 2005/0276388 A1 | 12/2005 | Ethier et al. | | |
| 2006/0018308 A1 * | 1/2006 | Choi et al. | | 370/352 |
| 2006/0029064 A1 * | 2/2006 | Rao et al. | | 370/389 |
| 2006/0077954 A1 * | 4/2006 | Monk et al. | | 370/352 |
| 2006/0272009 A1 * | 11/2006 | Stott | | 726/3 |

(Continued)

OTHER PUBLICATIONS

C. Huitema, "RFC 3605: Real Time Control Rptocol (RTCP) attribute in Session Description Protocol (SDP)." Microsoft, Oct. 2003. Web. Jul. 19, 2012. http://tools.ietf.org/rfc/rfc3605.txt.*

(Continued)

*Primary Examiner* — Faruk Hamza
*Assistant Examiner* — Andrew Oh
(74) *Attorney, Agent, or Firm* — Schwegman, Lundberg & Woessner, P.A.

(57) ABSTRACT

Various embodiments provide methods and systems operable to provide access to real time control protocol (RTCP) information for improved media quality control. An example embodiment includes a message processor to receive a message, the message including information indicative of an RTP port identifier, and to add to the received message information indicative of an auxiliary RTCP port identifier; and a message communication component to communicate the information indicative of an auxiliary RTCP port identifier to a node.

20 Claims, 10 Drawing Sheets

(56) References Cited

U.S. PATENT DOCUMENTS

| | | |
|---|---|---|
| 2006/0274760 A1 | 12/2006 | Loher |
| 2007/0005804 A1* | 1/2007 | Rideout .......................... 709/246 |
| 2007/0115963 A1* | 5/2007 | Vadlakonda et al. ......... 370/389 |
| 2007/0280127 A1* | 12/2007 | Connor et al. ................. 370/252 |
| 2008/0037518 A1 | 2/2008 | Kumarasamy et al. |
| 2008/0279179 A1* | 11/2008 | Baker ............................ 370/359 |
| 2008/0310428 A1* | 12/2008 | Lei et al. ........................ 370/400 |
| 2009/0196225 A1* | 8/2009 | Avila Gonzalez et al. .... 370/328 |

OTHER PUBLICATIONS

"U.S. Appl. No. 11/460,219, Response filed Sep. 10, 2012 to Non Final Office Actiion mailed May 9, 2012", 12 pgs.

\* cited by examiner

```
1. Received at SBC IN leg from OGW:
INVITE sip:8787@20.1.1.1:5060 SIP/2.0
From: <sip: 10.1.1.1>;tag=5B9F658-18A0
To: <sip:8787@20.1.1.1> c=IN IP4 10.1.1.1          <-OGW media address
m=audio 17012 RTP/AVP 0    <-Port 17012 is OGW RTP;
a=rtcp:17013 IN IP4 10.1.1.1  <-Port 17013 is OGW RTCP;
```

> Because Port 17013, in this example, is the default
> RTCP port (i.e. RTP Port 17012 + 1), the use of
> the a=rtcp: syntax is optional in this example.

```
a=rtpmap:0 PCMU/8000

2. Sent from SBC (which inserts its own RTCP address/port) OUT leg to TGW:
INVITE sip:8787@30.1.1.1:5060 SIP/2.0
From: <sip: 20.1.1.1>;tag=5B9F658-18A2
To: <sip:8787@30.1.1.1> c=IN IP4 10.1.1.1          <-Both RTP/RTCP ports and media address
m=audio 17012 RTP/AVP 0    from OGW are forwarded as it is in flow around mode
a=rtcp:17013 IN IP4 10.1.1.1
a=rtcp:19013 IN IP4 20.1.1.1 <- *** RTCP address/port of IPIP GW ***
a=rtpmap:0 PCMU/8000

3. Received at SBC OUT leg from TGW:
SIP/2.0 200 OK
To: <sip:8787@30.1.1.1>;tag=ds1dc5c6a
From: <sip: 20.1.1.1>;tag=5B9F658-18A2 c=IN IP4 30.1.1.1          <- TGW media address
m=audio 18012 RTP/AVP 0    <- Port 18012 is TGW RTP;
a=rtcp:18013 IN IP4 30.1.1.1 <- Port 18013 is TGW RTCP;
```

> Because Port 18013, in this example, is the default
> RTCP port (i.e. RTP Port 18012 + 1), the use of
> the a=rtcp: syntax is optional in this example.

```
a=rtpmap:0 PCMU/8000

4. Sent from SBC (which insert its own RTCP address/port) IN leg to OGW:
SIP/2.0 200 OK
To: <sip:8787@20.1.1.1>;tag=ds1dc5c6c
From: <sip: 10.1.1.1>;tag=5B9F658-18A0 c=IN IP4 30.1.1.1 <- Both RTP/RTCP ports and media address
m=audio 18012 RTP/AVP 0   from TGW are forwarded as it is in flow around mode
a=rtcp:18013 IN IP4 30.1.1.1
a=rtcp:19013 IN IP4 20.1.1.1 <-*** RTCP address/port of IPIP GW ***
a=rtpmap:0 PCMU/8000
```

FIG. 8

```
value MultimediaSystemControlMessage ::= response : openLogicalChannelAck :
{
    forwardLogicalChannelNumber 1
    forwardMultiplexAckParameters h2250LogicalChannelAckParameters :
    {
      mediaChannel unicastAddress : iPAddress :
      {
        network '01073866'H
        tsapIdentifier 18012
      }
      mediaControlChannel unicastAddress : iPAddress :     <- RTCP address & PORT
      {
        network '01073867'H <- TGW address/port for media flow around call
        tsapIdentifier 18013
      }
      mediaControlChannel unicastAddress : iPAddress :    <- RTCP address & PORT
      {
        network '01073857'H <- ****IPIP GW address/port for media
                                              flow around call***
        tsapIdentifier 19013
      }
      flowControlToZero FALSE
    }
}
```

METHOD AND APPARATUS FOR PROVIDING ACCESS TO REAL TIME CONTROL PROTOCOL INFORMATION FOR IMPROVED MEDIA QUALITY CONTROL

This patent application is a continuation-in-part of co-pending patent application Ser. No. 11/460,219 filed Jul. 26, 2006; assigned to the same assignee as the present patent application.

TECHNICAL FIELD

The disclosed subject matter relates to the field of network communications, and more particularly to voice over Internet Protocol (VoIP) communications.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006 Cisco Systems, Inc. All Rights Reserved.

BACKGROUND

Voice over Internet Protocol (VoIP) is being increasingly used by customers for local, long distance and international calls. There are many potential points of failure in a VoIP network, such as device failures, overloaded devices, network failures, etc. All these weaknesses in VoIP networks contribute to call failure or voice quality issues, such as no voice, one way voice, disturbed voice, etc.

The Real-time Transport Protocol (RTP) defines a standardized packet format for delivering audio and video over the Internet. It was developed by the Audio-Video Transport Working Group of the IETF and first published in 1996 as RFC 1889, which was obsoleted in 2003 by RFC 3550.

In its conventional implementation, RTP does not have a standard TCP or User Datagram Protocol (UDP) port on which it communicates. The only standard that RTP obeys is that UDP communications are done via an even port and the next higher odd port is used for RTP Control Protocol (RTCP) communications. RTP can carry any data with real-time characteristics, such as interactive audio and video. Call setup and tear-down is usually performed by the conventional SIP protocol. The fact that RTP uses a dynamic port range makes it difficult for it to traverse firewalls.

RTP was originally designed as a multicast protocol, but has since been applied in many unicast applications. It is frequently used in streaming media systems as well as videoconferencing and push to talk systems, making RTP the technical foundation of the Voice-over-IP (VoIP) industry. RTP goes along with the RTCP and it's built on top of the User Datagram Protocol (UDP).

RTP Control Protocol (RTCP) is a sister protocol of the Real-time Transport Protocol (RTP). RTCP is defined in RFC 3550 (which obsoletes RFC 1889). RTCP, which stands for Real-time Transport Control Protocol, provides out-of-band control information for an RTP data flow. RTCP partners RTP in the delivery and packaging of multimedia data, but does not transport any data itself. RTCP is used periodically to transmit control packets to participants in a streaming multimedia session. The primary function of RTCP is to provide feedback on the quality of service being provided by RTP.

RTCP gathers statistics on a media connection and information such as bytes sent, packets sent, lost packets, jitter, feedback and round trip delay. An application may use this information to increase the quality of service perhaps by limiting flow, or maybe using a low compression codec instead of a high compression codec. RTCP is often used for quality of service (QoS) reporting.

With the popularity of voice-over-IP (VoIP), and increasing deployments of VoIP interconnections, there is a strong need for providing quality VoIP calls. This often involves monitoring media quality using RTCP statistics and reporting media quality for any corrective actions. Usually, the RTCP data packets follow the RTP data packet pathway. If the RTCP follows the RTP pathway, the conventional process of measuring round-trip time (RTT) will produce accurate results. The RTT can be one metric for determining the quality of the connection. There are several conventional devices, such as Gatekeeper, a conventional session border controller (SBC) in a flow around media mode, a Cisco Call Manager, etc., which handle only signaling data, but not media data. In these scenarios, both RTP and RTCP flow between endpoints or gateways directly.

Without RTCP statistics, these conventional devices are unable to know the media data transfer status, such as one-way voice, no voice, garbled voice, etc. Hence, these conventional devices are not able to report media status or take any corrective actions based on the media status. Such corrective actions can include a rerouting of the media data to avoid a problematic pathway. In addition, these conventional devices generate call detail records (CDRs). However, these CDRs do not currently contain media related information. If these devices could get access to RTCP statistics, the devices could monitor the media status, report media quality, and take any necessary corrective actions based on the media status. Additionally, if these devices could get access to RTCP statistics, the devices could include this information in the CDRs. The CDRs could be analyzed further to make billing decisions or to further handle similar calls with a rerouting, if required. Similarly, if these devices could get access to RTCP statistics, signaling only devices could have media inactivity detection mechanisms to help clear hung calls and to handle appropriate billing. What is needed is a way for signaling only devices to get the RTCP statistics from endpoints or gateways, so that these devices can monitor media status, report media status, take any necessary corrective actions based on the media status, report voice quality in the CDRs, and also assist with system debug.

BRIEF DESCRIPTION OF THE DRAWINGS

FIG. 8 illustrates a SIP implementation of an example embodiment.

FIG. 9 illustrates an H323 implementation of an example embodiment.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a method and apparatus for providing access to real time control protocol information for improved media quality control.

Figure 1:
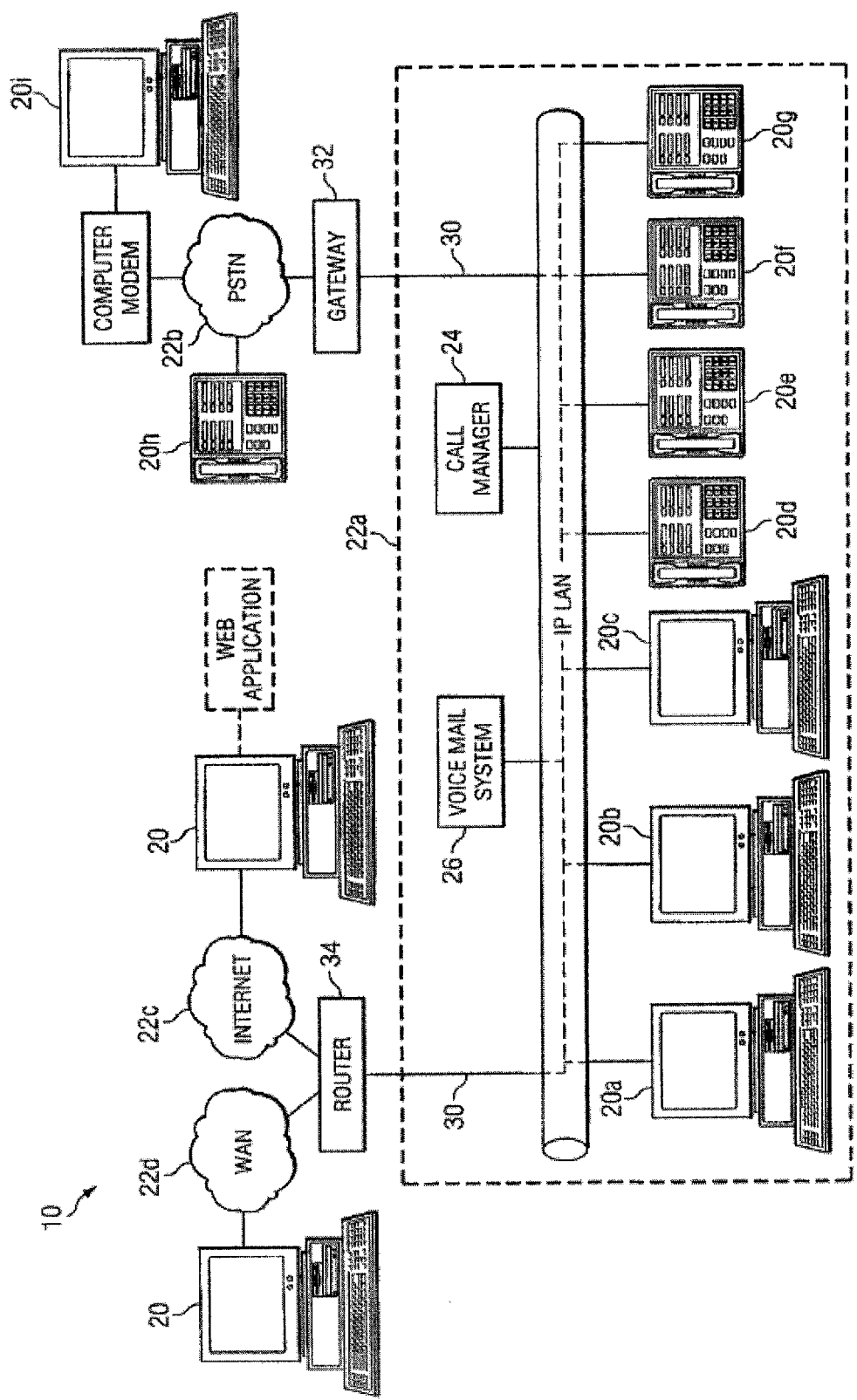
FIG. 1 illustrates a VoIP network environment in which various embodiments can operate.

FIG. 1 illustrates an example of a communications system 10 for implementing a voice-over-Internet Protocol (VoIP) system. System 10 includes a plurality of endpoints 20 having the ability to establish communication sessions between each other, using one or more of communication networks 22a-22d. System 10 also includes one or more call managers 24 that cooperate with a voice mail system 26 to manage incoming calls and other communications for endpoints 20. In the illustrated embodiment, system 10 includes a local area network (LAN) 22a, a Public Switched Telephone Network (PSTN) 22b, a public network 22c, and a wide area network (WAN) 22d, which cooperate to provide communication services to the variety of types of 30 endpoints 20 within system 10. Specifically, LAN 22a couples multiple endpoints 20a-20g for the establishment of communication sessions between endpoints 20a-20g and other endpoints 20 distributed across multiple cities and geographic regions. Generally, LAN 22a provides for the communication of packets, cells, frames, or other portions of information (generally referred to as packets herein) between endpoints 20. Accordingly, LAN 22a may include any combination of network components, gatekeepers, call managers, routers, hubs, switches, gateways, endpoints, or other hardware, software, or embedded logic implementing any number of communication protocols that allow for the exchange of packets in communication system 30. In the illustrated embodiment, LAN 22a includes a plurality of segments 30 that couple endpoints 20a-20g with call manager 24, voice mail system 26, gateway 32, 15 router 34, and communication networks 22b-22d. Specifically, segments 30 couple endpoints 20a-20g with PSTN 22b, Internet 22c, and WAN 22d to allow communication with various devices located outside of LAN 22a. Because both audio and/or video telecommunication 20 signals may be communicated over LAN 22a, LAN 22a may eliminate the need, in certain embodiments, for a separate telephone network, such as a private branch exchange (PBX), to provide telecommunication services within a business or other organization.

Although the illustrated embodiment includes four communication networks 22a-22d, the configuration of networks 22a-22d are provided as merely one example configuration of a system 10 for establishing communication sessions between and among system components. The term "communication network" should be interpreted as generally including any network capable of transmitting audio and/or video telecommunication signals, data, and/or messages, including signals, data, or messages transmitted through text chat, instant messaging, and e-mail (referred to herein generally as media). Any one of networks 22a-22d may be implemented as a local area network (LAN), wide area network (WAN), global distributed network such as the Internet, Intranet, Extranet, or any other form of wireless or wireline communication network. It is generally recognized that system 10 may include any combination of networks and that system 10 may include fewer or more networks 22a-22d as is required by the number of endpoints 20 or the desired traffic across system 10.

In various embodiments, communication network 10 employs voice communication protocols that allow for the addressing or identification of endpoints, nodes, and/or call managers coupled to communication network 10. For example, LAN 22a may be an Internet Protocol (IP) network or any other type of network that allows each of the components coupled together by LAN 22a in communication system 10 to be identified using IP addresses. IP networks transmit data (including telecommunication data/signals) by placing the data in packets and sending the packets individually to the selected destination. This may be referred to as a packet network. Other types of packet networks include ATM, Frame Relay, Ethernet, SNA, and SONET networks, among others. Unlike a circuit-switched network (e.g., PSTN 22b), dedicated bandwidth is not required for the duration of a communication session over LAN 22a. Instead, each endpoint sends packets as they become available for transmission. In this manner, network 10 may support any form and/or combination of point-to-point, multicast, unicast, or other techniques for exchanging VoIP media packets among components in communication system 10. Any network components capable of exchanging audio, video, or other data using frames or packets, are included within the scope of the various embodiments described and claimed herein.

The technology that allows communication signals to be transmitted over an IP network may be referred to as Voice over IP (VoIP). In various embodiments, one or more of endpoints 20a-20g may include an IP telephony device. IP telephony devices have the capability of encapsulating a user's voice (or other inputs) into EP packets so that the voice can be transmitted over LAN 22a (as well as Internet 22c and WAN 22d, which may also be packet networks). IP telephony devices may include telephones, fax machines, computers running telephony software, and any other devices capable of performing telephony functions over an IP network.

Call manager 24 controls IP telephony devices within LAN 22a. Call manager 24 is an application that controls call processing, routing, telephony device features and options (such as call hold, call transfer and caller ID), device configuration, and other telephony functions and parameters within communications system 10. When a user wishes to place a call from one telephony device, such as endpoint 20d, to another telephony device, such as endpoint 20e, on LAN 22a, the calling device transmits signaling to call manager 24 indicating the desired function and destination. Call manager 24 then instructs endpoints 20d and 20e to establish a network connection between themselves over LAN 22a. Once endpoints 20d and 20e have established a connection, a codec (coder/decoder) converts the voice or other telecommunication signals generated by the users of endpoints 20d and 20e from analog signals into digital form. Endpoints 20d and 20e may implement the codec either in software or as special-purpose hardware. For example, for a voice communication sent from endpoint 20d to endpoint 20e, the codec in endpoint 20d digitizes the outgoing telecommunication signals. Endpoint 20d then encapsulates the digital telecommunication data within IP packets so that the data can be transmitted over LAN 22a. This encapsulation is typically performed by Real-Time Transport Protocol (RTP) running over UDP/EP (User Datagram Protocol/Internet Protocol). The encapsulation process is well-known in the art, and will not be described in further detail. The IP packets are then transported over LAN 22a via the IP protocol to endpoint 20e and other endpoints participating in the call. A codec in the receiving endpoint 20e then translates the IP packet data into analog voice signals for presentation to the user. This process is repeated each time that a call participant (or other source) generates telecommunication signals.

In addition to intra-LAN telephone calls, calls can also be placed to non-IP telephony devices, such as endpoint 20h, that are connected to PSTN 22b. PSTN 22b includes switching stations, central offices, mobile telephone switching offices, pager switching offices, remote terminals, and other related telecommunications equipment that are located throughout the world. Calls placed to endpoint 20h are made through VoIP-to-PSTN gateway 32. Gateway 32 converts analog or digital circuit-switched data transmitted by PSTN 22b or a PBX) to packet data transmitted by LAN 22a, and vice-versa. Gateway 32 also translates between the VoIP call control system protocol and the Signaling System 7 (SS7) or other protocols used in PSTN 22b. For example, when making a call to a PSTN endpoint 20h from an IP endpoint 20d, the telecommunication signal generated by the user of endpoint 20d is digitized and encapsulated, as described above. The packets are then transmitted over LAN 22a to gateway 32. Gateway 32 converts the data in the packets to the format (either digital or analog) used by PSTN 22b. The voice signals are then sent to the PSTN endpoint 20h over PSTN 22b. This process is continued between LAN 22a and PSTN 22b through gateway 32 until the call is complete. Calls also may be made between IP telephony devices, such as endpoint 20d, and other IP telephony devices located on Internet 22c or across WAN 22d. Again, the telecommunication data is digitized and encapsulated into IP packets at the telephony device. However, unlike communications with devices on PSTN 22b, a gateway is not needed to convert the IP packets to another format. A router 34 (or other similar device such as a hub or bridge) directs the packets to the IP address of the receiving IP telephony device.

In an example scenario, a first end user may be associated with a first endpoint 20d, which comprises a telephony device, and a second end user may be associated with a second endpoint 20e, which comprises another telephony device. To initiate a communication session, the first end user may use first endpoint 20d to call the second end user at second endpoint 20e. Where the second end user is participating in a previous call or is otherwise unavailable to take the incoming call from the first end user, call manager 24 may intervene by intercepting the call and forwarding the call to voice mail system 26.

Figure 2:
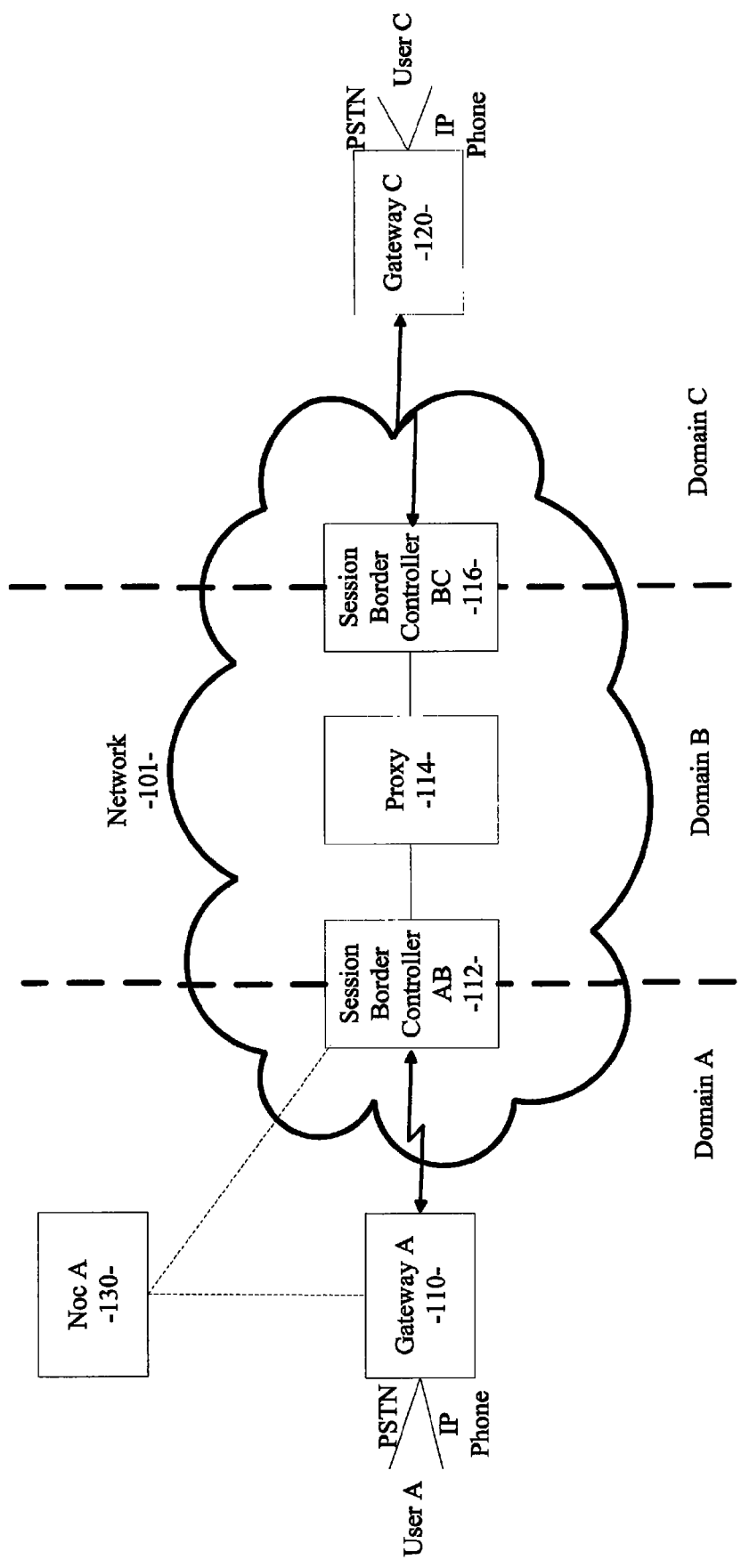
FIG. 2 illustrates a VoIP call connection between a VoIP call originator and a VoIP call destination in a VoIP network environment in which various embodiments can operate.

FIG. 2 illustrates a VoIP connection between a user A and a user C via a network 101. In general, user A is connected to gateway A 110 via a PSTN telephone or an IP phone as described above in connection with FIG. 1. Gateway A 110 receives telecommunication data from user A, which is digitized and encapsulated into IP packets at the telephony device. The gateway A 110 transfers this telecommunication data into network 101. The telecommunication data can take a variety of paths through network 101. In one example, Gateway A 110 transfers the telecommunication data to a session border controller AB 112. As shown in the example of FIG. 2, network 101 is partitioned into a plurality of domains. Such network partitioning is common in conventional wide-area networks. A well known session border controller component such as session border controller AB 112 is provided in network 101 to transition data between two different domains within network 101. In this example, session border controller AB 112 serves as the transition component between Domain A and Domain B illustrated in FIG. 2. The session border controller AB 112, in this example, receives telecommunication data from Gateway A 110 and forwards the data to a proxy 114 in domain B. It will be apparent to one of ordinary skill in the art that session border controller AB 112 could also forward the telecommunication data to other network components such as network routers, hubs, switches, proxies, and the like. In the example of FIG. 2, the proxy 114 is also a well known VoIP network component. The proxy 114 can then forward the telecommunication data to another session border controller BC 116. Session border controller BC 116 serves as the transition component between Domain B and Domain C illustrated in FIG. 2. The session border controller BC 116, in this example, receives telecommunication data from proxy 114 and forwards the data to Gateway C 120. Gateway C 120 then routes the telecommunication data to a VoIP telephony device operated by user C. The telephony device operated by user C (e.g. a PSTN telephone or an IP phone) can thereby be set up to receive a call from user A. In this manner, a VoIP connection between user A and user C can be signaled through network 101. As well known in a conventional VoIP network, once the VoIP call is set up, media data corresponding to the content of the call (e.g. audio and/or video telecommunication signals, data, and/or messages, including signals, data, or messages transmitted through text chat, instant messaging, and e-mail) can be transferred between user A and user C via a different network path than the path taken by the signaling data as described above.

As well known to those of ordinary skill in the art, networks typically have a network operations center (NOC) that monitors and manages the operation of a particular network and/or a network domain. In the example of FIG. 2, network operations center (NOC) A 130 serves as the network management center for domain A of network 101. NOC A 130 can monitor the flow of network data packets between network components within domain A at the physical network layer; however, NOC A 130 cannot, in conventional networks, monitor the integrity of data transfers in a VoIP call connection between user A and user C. Because VoIP signaling data and VoIP media data can take different paths through multiple domains of a wide-area network, current network operations centers cannot determine with specificity the point of failure in network 101 when an attempted VoIP connection between user A and user C fails. This is because current VoIP networks do not have the capability for call signaling and media tracing in a VoIP network. As will be described in more detail below, the various embodiments described and claimed herein provide this capability.

Referring still to FIG. 2, an example of a VoIP call connection between User A and User C was described above. However, in some cases, the VoIP call connection cannot be established; because a network element in a path between user A and user C is unable to complete the transfer of a telecommunications signaling packet to a next network element in the path to the destination node (e.g. user C in this example). For example, proxy 114 may attempt to forward telecommunication data as part of the VoIP signaling process to session border controller BC 116. However, session border controller BC 116 may be unresponsive or unable to complete the transfer of the telecommunication data from proxy 114. In this case, proxy 114 must report an error condition back to session border controller AB 112, which reports an error back to gateway A 110, which reports the error to the VoIP telephony device of user A. Unfortunately, in a conventional network, gateway A 110 cannot determine from the error message received from session border controller AB 112 where or why the error occurred at some point downstream in network 101. All that gateway A 110 can determine from the error message is that some network component in network 101 was unable to complete the transfer of a telecommunications signaling packet to a next network element in the path to the destination node. Because gateway A 110 cannot determine the precise point of failure in the network 101, it is very difficult for gateway A 110 to correct the problem. In some cases, gateway A 110 can notify NOC A 130 of the problematic VoIP connection as indicated by the dashed line shown in FIG. 2 between gateway A 110 and NOC A 130. NOC A 130 can re-try the VoIP connection by sending test VoIP signaling packets to session border controller AB 112, as indicated by the dashed line shown in FIG. 2 between NOC A 130 and session border controller AB 112. Alternatively, NOC A 130 can re-try the VoIP connection by sending test VoIP signaling packets to gateway A 110, which forwards the test packets to session border controller AB 112, as indicated by the dashed lines shown in FIG. 2 between NOC A 130, gateway A 110, and session border controller AB 112. It will be understood by those of ordinary skill in the art that NOC A 130 needs to authenticate itself, using well known techniques, to the session border controller AB 112 and/or the gateway A 110 prior to initiating a test of a VoIP connection. However, these VoIP test signaling packets sent into network 101 by NOC A 130 can suffer the same fate as the signaling packets sent earlier by gateway A 110. That is, the session border controller BC 116 may be unresponsive or unable to complete the transfer of the test data from proxy 114. In this case, proxy 114 must again report an error condition back to session border controller AB 112, which reports an error back to NOC A 130. Again, all that NOC A 130 can determine from the error message is that some network component in network 101 was unable to complete the transfer of a telecommunications signaling packet to a next network element in the path to the destination node. Because NOC A 130 cannot determine the precise point of failure in the network 101, it is also very difficult for NOC A 130 to correct the problem.

Figure 3:
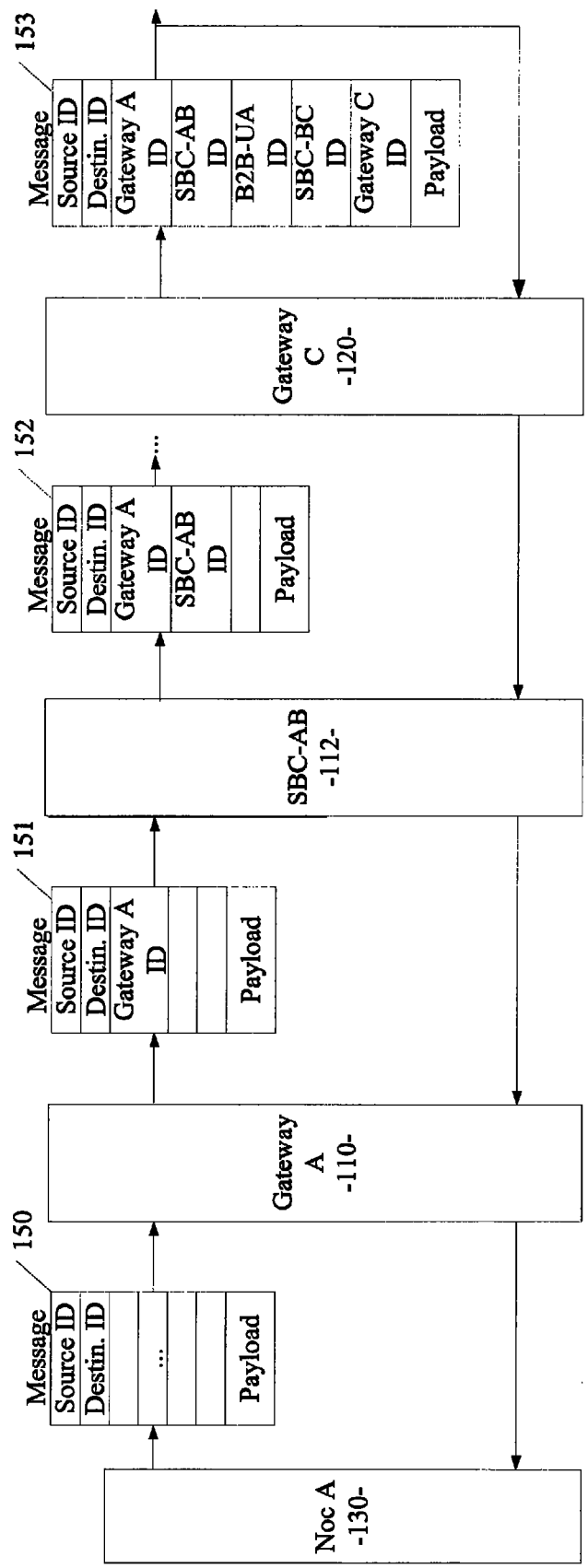
FIG. 3 illustrates an example of the assertive model of various embodiments.

Referring now to FIG. 3, an example illustrates NOC A 130 attempting to pinpoint the source of a network problem by sending a test signaling packet (e.g. message 150) to gateway A 110. This test data 150 is similar to a standard telecommunications signaling packet that would be sent for a standard VoIP connection, except the message 150 includes a special code that activates trace information functionality in each network element that processes the message 150. This special code can be a bit pattern in the header of the message or other form of a unique coding. Alternatively, a VoIP call trace mode can be configured in each network element in network 101 through an independent process. The trace mode activates the trace information functionality, a VoIP call trace information generator, in each network element as described herein. Upon receipt of the test message 150, the network element (e.g. gateway A 110) determines the test message 150 (or a previously configured trace mode) has activated trace information functionality in the network element. This trace information functionality can be installed in each network element as a software or firmware download or as a pre-configured hardware component of the network element. As part of this trace information functionality, the network element appends VoIP trace information to the test message 150, the trace information including a network device identifier of the network element prior to routing the test packet to the next network element on the path from a VoIP call originator (e.g. NOC A 130 or user A) to a VoIP call destination (e.g. user C). Thus, as shown in FIG. 3, message 150 has been modified by gateway A 110 to create message 151, which includes the trace information (e.g. a gateway A identifier or ID) provided by gateway A 110. Similarly, the next network element, session border controller AB 112, upon receipt of the test message 151 from the prior network element (e.g. gateway A 110) determines the test message 151 (or a previously configured trace mode) has activated trace information functionality in the network element. As part of this trace information functionality, the network element (e.g. session border controller AB 112) appends VoIP trace information to the test message 151, the trace information including a network device identifier of the network element prior to routing the test packet to the next network element on the path from the VoIP call originator (e.g. NOC A 130 or user A) to the VoIP call destination (e.g. user C). Thus, as shown in FIG. 3, message 151 has been modified by session border controller AB 112 to create message 152, which includes new trace information (e.g. a session border controller AB 112 identifier or ID) provided by session border controller AB 112. At this point in the progression of the test VoIP signaling packet on the path from the VoIP call originator (e.g. NOC A 130 or user A) to the VoIP call destination (e.g. user C), message 152 includes trace information that includes an identifier of each network element that has so far processed the message. As shown in FIG. 3, this process can continue for each network element on the path from the VoIP call originator (e.g. NOC A 130 or user A) to the VoIP call destination (e.g. user C). If the test VoIP connection is successful, the final VoIP network element in the path (e.g. Gateway C 120) will receive the test message. Gateway C 120 can then append its own VoIP trace information to the test message 152, to produce message 153. As shown in the example of FIG. 3, message 153 includes trace information from each network element in the path from the VoIP call originator (e.g. NOC A 130 or user A) to the VoIP call destination (e.g. user C). Gateway C 120 can then return the test message with the trace information to the VoIP test call originator (e.g. NOC A 130 or user A). In this manner, the trace information in message 153 can be used by the VoIP test call originator to trace the path of the VoIP call through network 101 from the VoIP call originator (e.g. NOC A 130 or user A) to the VoIP call destination (e.g. user C).

As illustrated in FIG. 3, various embodiments can be used for VoIP call trace routing for successful calls (i.e. those that reach the destination) as well as for calls that fail to make a connection to a destination.

Figure 4:
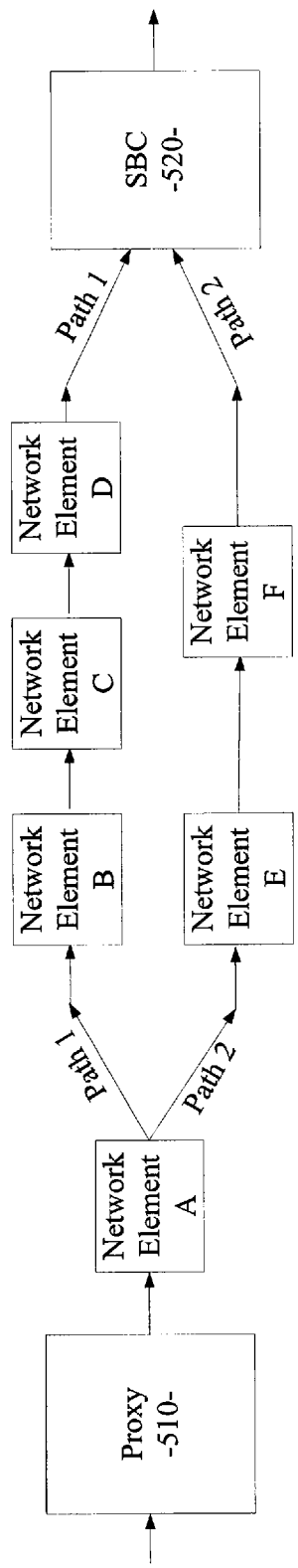
FIG. 4 illustrates an example of the various physical paths VoIP data can take to a VoIP call destination.

FIG. 4 illustrates how a particular VoIP telecommunications signaling packet can take any of a variety of paths between VoIP network elements. For example, a proxy component 510 can send a VoIP signaling packet to a network element A, which can then route the signaling packet via path 1 through network elements B, C, and D. Alternatively, network element A can route the signaling packet via path 2 through network elements E and F. The particular routing chosen at a given moment in time depends on the traffic load, the types of traffic, and the condition of the various involved network elements. Using conventional network functionality, proxy 510 can query the network to determine the physical path that the signaling packet will take between proxy 510 and session border controller (SBC) 520 prior to sending the signaling packet on to session border controller (SBC) 520. For example, proxy 510 can query the network for a physical routing prior to sending the signaling packet to network element A. The network may respond with a physical routing indicating, for example, that the signaling packet will be routed on path 1 through network elements A, B, C, and D on its way to VoIP network element SBC 520. In various alternative embodiments, this physical network routing information can be included in the trace information appended to a signaling packet by proxy 510 prior to forwarding the signaling packet to the next VoIP network element (e.g. SBC 520).

Figure 5:
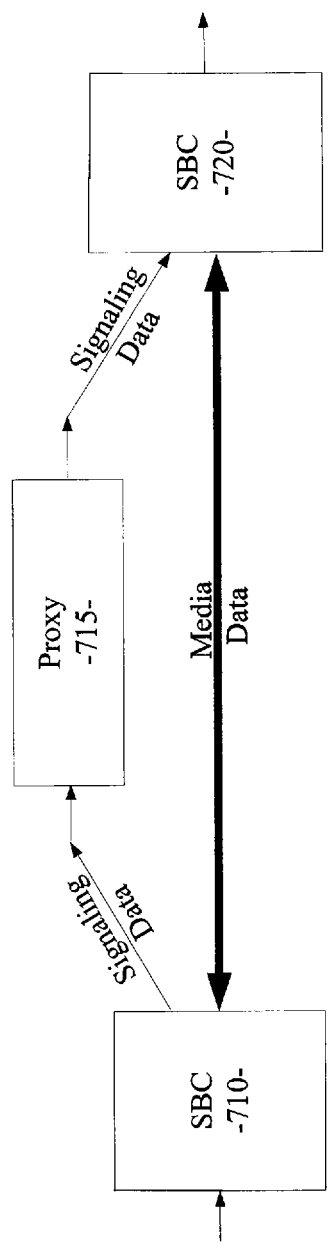
FIG. 5 illustrates a network environment in which an example of a VoIP signaling connection and a VoIP media connection is shown.

FIG. 5 illustrates the distinction between the routing of signaling data associated with a VoIP call connection and the routing of media data associated with the VoIP call connection. As well known, a typical VoIP call includes media content such as, audio and/or video telecommunication signals, data, and/or messages, including signals, data, or messages transmitted through text chat, instant messaging, e-mail, and the like. In a conventional VoIP call, the routing of signaling data can take a different path than the routing of media data associated with the VoIP call connection. In many cases, the media data requires a higher bandwidth connection than the signaling data. However, the various embodiments described herein are useable for any kind of data being sent between a VoIP call originator and a VoIP call destination as part of a VoIP call.

Various embodiments can be implemented with different VoIP protocols. An example of an embodiment implemented with a SIP protocol is provided below. It will be apparent to those of ordinary skill in the art that other embodiments can be implemented with other VoIP protocols (e.g. H.323).

In an embodiment implemented with conventional Session Initiation Protocol (SIP), VoIP call trace routing can be implemented by adding a new optional field to the conventional SIP signaling packet. The new field of the VoIP signaling packet can include information indicative of a request for trace information. The new field can be called, for example, Signaling-Trace-Route. In response to a request for call trace routing, each network device adds its own identifier information, such as IP address or device name identifier, along with a domain name. Note that some network devices may not include their IP address, for example, for address hiding purposes. In this case, a device/hostname could be used instead. An example of a SIP signaling packet in one embodiment is provided below.

INVITE sip: 9497778888@15.6.39.10 SIP/2.0.
    From: sip: 9498889999@15.6.39.10; tag=1c23623
    To: sip: 9497778888@15.6.39.10
    Call-ID: call-973574142-2@15.5.27.209
    Cseq: 1 INVITE
    Signaling-Trace-Route: CME1@cisco.com When the example SIP signaling packet traverses a network device, for example, a network device identified as IPIP-GW2, an embodiment updates the SIP signaling packet as follows:

INVITE sip: 9497778888@15.6.39.10 SIP/2.0.
    From: sip: 9498889999@15.6.39.10; tag=1c23623
    To: sip: 9497778888@15.6.39.10
    Call-ID: call-973574142-2@15.5.27.209
    Cseq: 1 INVITE
    Signaling-Trace-Route: CME1@cisco.com; IPIP-GW2@att.com As the example SIP signaling packet continues to traverse other network devices, for example, network devices identified as CSPS2 and CME-5, an embodiment updates the SIP signaling packet as follows:

INVITE sip: 9497778888@15.6.39.10 SIP/2.0.
    From: sip: 9498889999@15.6.39.10; tag=1c23623
    To: sip: 9497778888@15.6.39.10
    Call-ID: call-973574142-2@15.5.27.209
    Cseq: 1 INVITE
    Signaling-Trace-Route: CME1@cisco.com; IPIP-GW2@att.com; CSPS2@sbc.com; CME-5@sbc.com If this final device is a terminating gateway, the SIP signaling packet with the trace information will be sent back to the originating network device thereby providing VoIP call signaling trace routing information.

Similarly, an embodiment for VoIP media trace routing can be implemented with conventional Session Initiation Protocol (SIP). In this case, VoIP media trace routing can be implemented by adding a new optional field to the conventional SIP media packet. The new field can be called, for example, Media-Trace-Route. In response to a request for media trace routing, each network device adds its own identifier information, such as IP address or device name identifier, along with a domain name. Note that some network devices may not include their IP address, for example, for address hiding purposes. In this case, a device/hostname could be used instead. An example of a SIP media packet in one embodiment is provided below.

INVITE sip: 9497778888@15.6.39.10 SIP/2.0.
    From: sip: 9498889999@15.6.39.10; tag=1c23623
    To: sip: 9497778888@115.6.39.10
    Call-ID: call-973574142-2@15.5.27.209
    Cseq: 1 INVITE
    Media-Trace-Route: User-A@CME1.cisco.com When the example SIP media packet traverses a network device, for example, a network device identified as IPIP-GW2, an embodiment updates the SIP media packet as follows:

INVITE sip: 9497778888@15.6.39.10 SIP/2.0.
    From: sip: 9498889999@15.6.39.10; tag=1c23623
    To: sip: 9497778888@15.6.39.10
    Call-ID: call-973574142-2@15.5.27.209
    Cseq: 1 INVITE
    Media-Trace-Route:User-A@CME1.cisco.com; MTP_1@IPIP-GW2.att.com As the example SIP media packet continues to traverse other network devices, for example, network devices identified as CSPS2 and CME-5, an embodiment updates the SIP media packet as follows:

INVITE sip: 9497778888@15.6.39.10 SIP/2.0.
    From: sip: 9498889999@15.6.39.10; tag=1c23623
    To: sip: 9497778888@15.6.39.10
    Call-ID: call-973574142-2@1.5.5.27.209
    Cseq: 1 INVITE
    Media-Trace-Route:User-A@CME1.cisco.com; MTP_1@IPIP-GW2.att.com; MTP_2@CSPS2.sbc.com; MTP_3@CME-5.sbc.com If this final device is a terminating gateway, the SIP media packet with the trace information will be sent back to the originating network device thereby providing VoIP media trace routing information.

When multiple media types are involved, such as audio and video, media packets corresponding to each media type can take different routings through the network. These routings for each media type can be traced using the techniques taught herein. For example, in a teleconference scenario, video data may traverse through a media switch, but the corresponding audio may traverse through an audio mixer. In any case, the various embodiments taught herein can be used to trace the path of each type of media data through a network.

Though an example using a SIP protocol implementation is described above, other embodiments using other VoIP protocols, such as H.323, can be implemented in a similar manner using the techniques taught herein.

In some implementations, the RTCP information may be passed via a session border controller (SBC), while RTP data flows directly between the end points on a different path than the RTCP data. This poses a problem when a user wants to do measurements like round-trip time (RTT), which assumes RTP and RTCP data packets are taking the same path. In the various embodiments described herein, the existing implementation of RTCP and RTP are kept intact and additional RTCP information can be sent via the SBC. In this manner, the measurement of RTT is not adversely affected. Because the existing RTCP implementation of sending RTCP information along with RTP is untouched in the various embodiments described herein, existing systems can continue to be used for RTT and similar calculations.

In the various embodiments described herein, a system and method is described to generate and pass RTCP information via the SBC, while the RTP and corresponding RTCP data flows around (i.e. bypasses) the SBC. Currently, for conventional flow around calls, both RTP and RTCP data flows around (i.e. bypasses) the SBC and does not travel through the SBC. In the conventional implementation, the session description protocol (SDP) has a particular syntax for specifying an IP address and an RTP port number. In the conventional implementation, the RTCP port is either implicitly derived from the RTP port or explicitly specified using a=rtcp: attribute. In the various embodiments described herein, the SBC address and port are explicitly included for receiving RTCP data. This SBC address and port is provided in addition to the endpoint RTCP address and port number. In a particular embodiment, multiple RTCP addresses and port numbers may be provided as part of the SDP syntax using a=rtcp: attribute.

Figure 6:
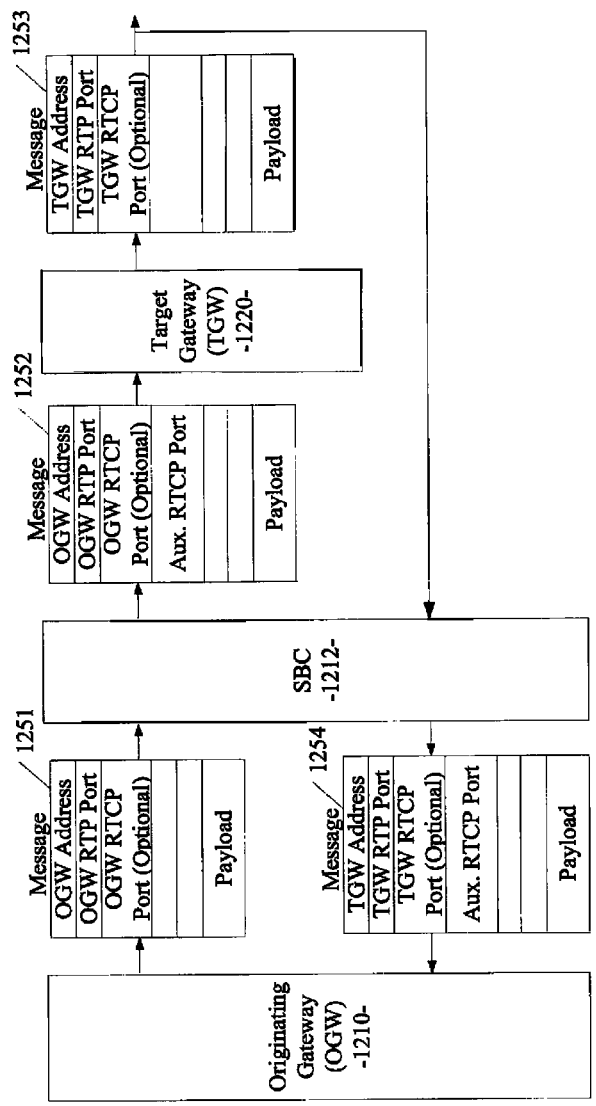
FIG. 6 illustrates a network environment showing an example of a system for providing auxiliary RTCP port information.

FIG. 6 illustrates a network environment showing an example of a system for providing auxiliary RTCP port information. FIG. 6 shows an embodiment for call/media flow around RTP/RTCP and flow through RTCP information. As shown in FIG. 6, an originating gateway 1210 initiates a communication with a session border controller 1212 by sending a message 1251. The message 1251 can include an outgoing gateway address, an RTP port identifier through which call/media data will be transferred, and an optional primary RTCP port identifier. Because conventional systems assume the primary RTCP port identifier can be derived from the RTP port identifier, the explicit specification of the primary RTCP port identifier is optional. The SBC 1212, or other node RTCP information generator, uses a message processor to receive this message data from the OGW 1210 and to add an auxiliary RTCP port identifier for the transfer of call/media status information on an auxiliary port in addition to the primary RTCP already configured by the OGW 1210 (i.e. the OGW RTCP Port identifier). This auxiliary RTCP port can be used by a third-party server, route server, gatekeeper, or the like to monitor the status of the call/media flow between the OGW 1210 and TGW 1220. The SBC 1212, or other node RTCP information generator, can use a message communication component to communicate the identity of the auxiliary RTCP port identifier to the TGW 1220 in message 1252. The SBC 1212 can also communicate the identity of the auxiliary RTCP port identifier to the OGW 1210 in message 1254.

Figure 7:
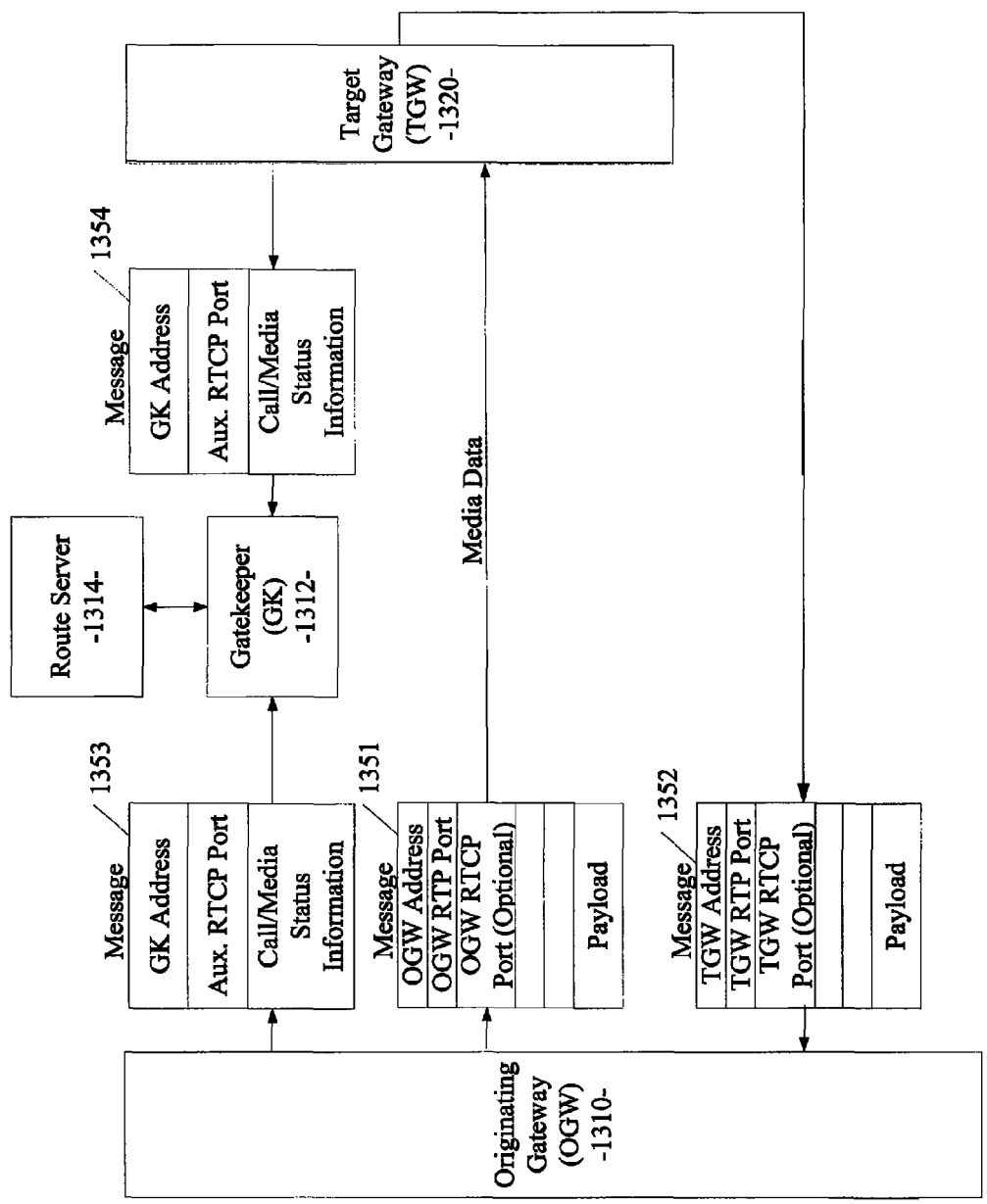
FIG. 7 illustrates a network environment showing an example of a system for providing auxiliary RTCP information to a gatekeeper that handles call signaling while media data travels directly between an originating gateway and a target gateway.

FIG. 7 illustrates a network environment showing an example of a system for providing auxiliary RTCP information to a gatekeeper that handles call signaling while media data travels directly between an originating gateway and a target gateway. As shown in FIG. 7, given a previously configured auxiliary RTCP port identifier for communicating with gatekeeper 1312, OGW 1310 can send call/media status information in message 1353 via the auxiliary RTCP port to a gatekeeper 1312. The gatekeeper 1312 can monitor the status of the media data transmission occurring between the OGW 1310 and TGW 1320. Gatekeeper 1312 may also include the call/media status information in call detail records (CDR's). Gatekeeper 1312 may also pass call/media status information to a route server 1314. Route server 1314 may also monitor the status of the media data transmission occurring between the OGW 1310 and TGW 1320. Route server 1314 may also be used to make efficient routing decisions based on the call/media status information. In this manner, the system provides access to real time control protocol information for improved media quality control.

FIG. 8 illustrates a SIP implementation of an example embodiment of the system described above. FIG. 9 illustrates an H323 implementation of an example embodiment of the system described above.

Figure 10:
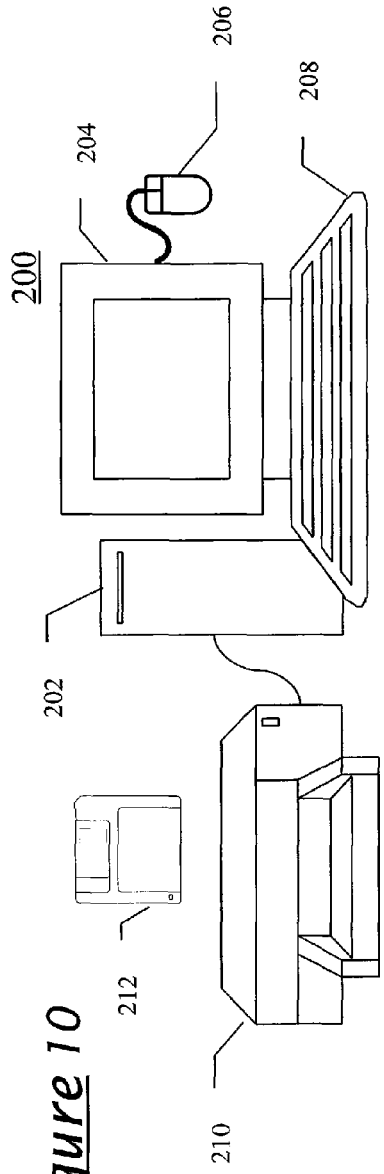
FIGS. 10 and 11 illustrate an example of a computer system on which processing for various embodiments can be implemented.
Figure 11:
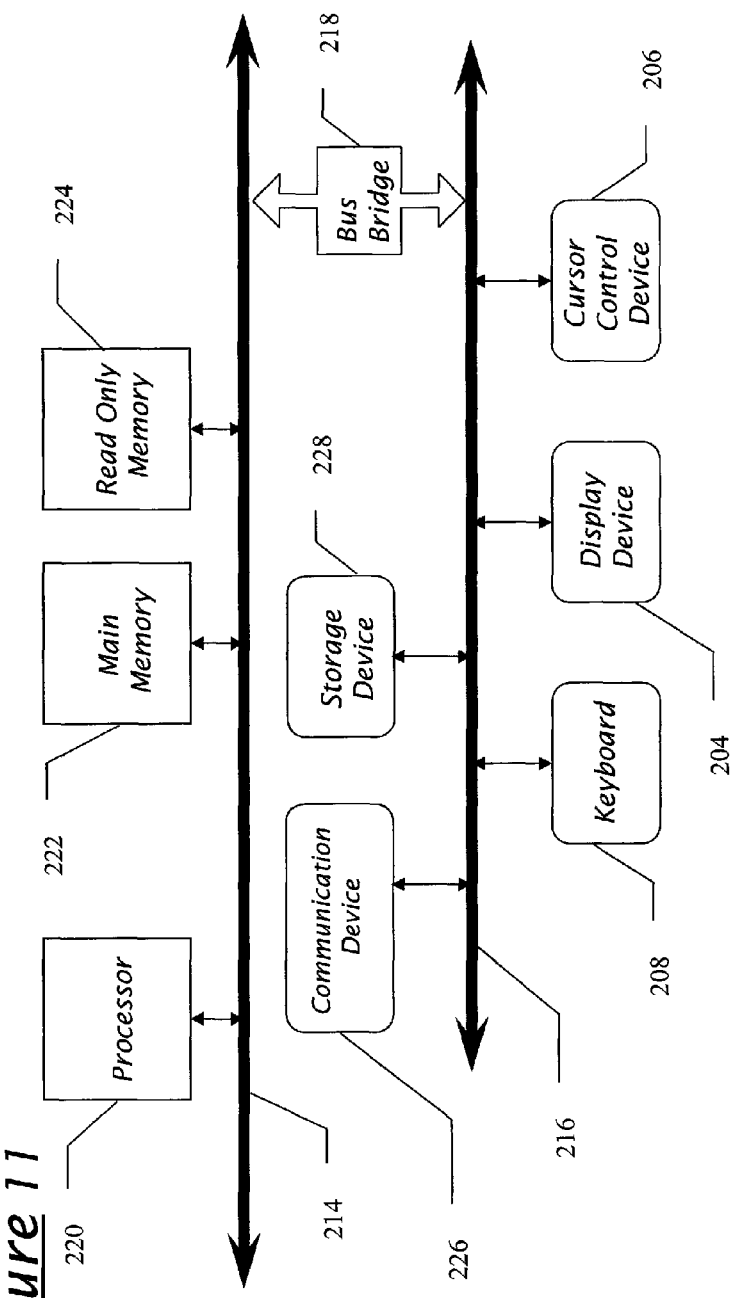

Having described above various embodiments of the network environment in which embodiments may operate, FIGS. 10 and 11 show an example of a computer system 200 illustrating an exemplary host, client 280, or server 250 computer system, in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 250, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 250 via a conventional network infrastructure such as the infrastructure illustrated and described above.

The system of an example embodiment includes software, information processing hardware, and various processing steps, which are described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of data structures may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

The software and/or data described herein may further be transmitted or received over a network 260 via the communication device 226 utilizing any one of a number of well-known transfer protocols, for example, the hyper text transfer protocol (HTTP). While the machine-readable medium 212 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a method and apparatus for providing access to real time control protocol information for improved media quality control is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   receiving a message, the message including information indicative of a Real-time Transport Protocol (RTP) port identifier, the message also including information indicative of a primary Real-time Transport Control Protocol (RTCP) port identifier associated with the RTP port identifier;
   adding to the received message information indicative of an auxiliary RTCP port identifier associated with the RTP port identifier, the auxiliary RTCP port identifier being different from the primary RTCP port identifier; and
   communicating the information indicative of an auxiliary RTCP port identifier to a node, wherein an auxiliary RTCP port identified in the information indicative of the auxiliary RTCP port identifier is used to convey call/media status information to the node.

2. The method as claimed in claim 1 wherein the information indicative of an auxiliary RTCP port identifier is communicated to an originating gateway node.

3. The method as claimed in claim 1 wherein the information indicative of an auxiliary RTCP port identifier is communicated to a target gateway node.

4. The method as claimed in claim 1 wherein the information indicative of an auxiliary RTCP port identifier is communicated to a third party node.

5. The method as claimed in claim 1 wherein the information indicative of art auxiliary RTCP port identifier includes information indicative of a node address.

6. An apparatus comprising:
   means for receiving a message, the message including information indicative of a Real-time Transport Protocol (RTP) port identifier, the message also including information indicative of a primary Real-time Transport Control Protocol (RTCP) port identifier associated with the RTP port identifier;
   means for adding to the received message information indicative of an auxiliary RTCP port identifier associated with the RTP port identifier, the auxiliary RTCP port identifier being different from the primary RTCP port identifier; and
   means for communicating the information indicative of an auxiliary RTCP port identifier to a node, wherein an auxiliary RTCP port identified in the information indicative of the auxiliary RTCP port identifier is used to convey call/media status information to the node.

7. The apparatus as claimed in claim 6 wherein the information indicative of an auxiliary RTCP port identifier is communicated to an originating gateway node.

8. The apparatus as claimed in claim 6 wherein the information indicative of an auxiliary RTCP port identifier is communicated to a target gateway node.

9. The apparatus as claimed in claim 6 wherein the information indicative of an auxiliary RTCP port identifier is communicated to a third party node.

10. The apparatus as claimed in claim 6 wherein the information indicative of an auxiliary RTCP port identifier includes information indicative of a node address.

11. A node Real-time Transport Control Protocol (RTCP) information generator comprising:
    a message processor to receive a message, the message including information indicative of a Real-time Transport Protocol (RTP) port identifier, the message also including information indicative of a primary RTCP port identifier associated with the RTP port identifier, and to add to the received message information indicative of an auxiliary RTCP port identifier associated with the RTP port identifier, the auxiliary RTCP port identifier being different from the primary RTCP port identifier; and
    a message communication component to communicate the information indicative of an auxiliary RTCP port identifier to a node, wherein an auxiliary RTCP port identified in the information indicative of the auxiliary RTCP port identifier is used to convey call/media status information to the node.

12. The node RTCP information generator as claimed in claim 11 wherein the information indicative of an auxiliary RTCP port identifier is communicated to an originating gateway node.

13. The node RTCP information generator as claimed in claim 11 wherein the information indicative of an auxiliary RTCP port identifier is communicated to a target gateay node.

14. The node RTCP information generator as claimed in claim 11 wherein the information indicative of an auxiliary RTCP port identifier is communicated to a third party node.

15. The node RTCP information generator as claimed in claim 11 wherein the information indicative of an auxiliary RTCP port identifier includes information indicative of a node address.

16. A system comprising:
    a plurality of network elements including a Voice over Internet Protocol (VoIP) call originator and a VoIP call destination, each of the plurality of network elements including a message processor to receive a message, the message including information indicative of a Real-time Transport Protocol (RTP) port identifier, the message also including information indicative of a primary Real-time Transport Control Protocol (RTCP) port identifier associated with the RTP port identifier, the message processor further to add to the received message information indicative of an auxiliary RTCP port identifier associated with the RTP port identifier, the auxiliary RTCP port identifier being different from the primary RTCP port identifier, each of the plurality of network elements further including a message communication component to communicate the information indicative of an auxiliary RTCP port identifier to a node, wherein an auxiliary RTCP port identified in the information indicative of the auxiliary RTCP port identifier is used to convey call/media status information to the node.

17. The system as claimed in claim 16 wherein the information indicative of an auxiliary RTCP port identifier is communicated to an originating gateway node.

18. The system as claimed in claim 16 wherein the information indicative of an auxiliary RTCP port identifier is communicated to a target gateway node.

19. The system as claimed in claim 16 wherein the information indicative of an auxiliary RTCP port identifier is communicated to a third party node.

20. The system as claimed in claim 16 wherein the information indicative of an auxiliary RTCP port identifier includes information indicative of a node address.

\* \* \* \* \*